US007675518B1

(12) United States Patent
Miller (10) Patent No.: US 7,675,518 B1
(45) Date of Patent: Mar. 9, 2010

(54) SYSTEM AND METHOD FOR GENERATING IMAGE SHADOWS WITH RAY-COHERENT INTEGRATION OF EXTRUDED TRANSPARENCY MAPS (75) Inventor: Gavin S. P. Miller, Los Altos, CA (US)

(73) Assignee: Adobe Systems, Incorporated, San Jose, CA (US)

(*) Notice: Subject to any disclaimer, the term of this patent is extended or adjusted under 35 U.S.C. 154(b) by 760 days.

(21) Appl. No.: 11/515,689

(22) Filed: Sep. 5, 2006

(51) Int. Cl.
 G06T 15/00 (2006.01)
(52) U.S. Cl. .................... 345/426; 345/630; 715/804
(58) Field of Classification Search ........... 345/426, 345/630; 715/804
See application file for complete search history.

(56) References Cited

U.S. PATENT DOCUMENTS

| 5,124,803 | A | | 6/1992 | Troxel | |
|---|---|---|---|---|---|
| 5,596,690 | A | * | 1/1997 | Stone et al. | 345/630 |
| 5,729,704 | A | * | 3/1998 | Stone et al. | 715/804 |
| 5,889,527 | A | | 3/1999 | Tsai | |
| 6,020,897 | A | | 2/2000 | Carlsen et al. | |
| 6,049,339 | A | | 4/2000 | Schiller et al. | |
| 6,894,704 | B1 | | 5/2005 | Bourdev et al. | |
| 7,439,975 | B2 | * | 10/2008 | Hsu | 345/426 |
| 2006/0176303 | A1 | | 8/2006 | Fairclough | |
| 2009/0033661 | A1 | * | 2/2009 | Miller | 345/426 |

OTHER PUBLICATIONS

"Shadows: Rendering fake soft shadows with smoothies"; Eric Chan, Fredo Durand; Proceedings of the 14th Eurographics workshop on rendering EGRW '03; Publisher Eurographics Association; 12 pages.
Paglieroni, David W., and Sidney M. Petersen, "Height Distributional Distance Transform Methods for Height Field Ray Tracing," Loral Western Development Labs, ACM Transactions on Graphics, vol. 13, No. 4, Oct. 1994, pp. 376-399.
Anderson, David P., "Hidden Line Elimination in Projected Grid Surfaces," University of Wisconsin, ACM Transactions on Graphics, vol. 1, No. 4, Oct. 1982, pp. 274-288.
Coquillart, Sabine, and Michel Gangnet, "Shaded Display of Digital Maps," National School of Mines of Saint-Etienne, IEEE CG&A, Jul. 1984, pp. 35-42.

* cited by examiner

Primary Examiner—Phu K Nguyen
(74) Attorney, Agent, or Firm—Robert C. Kowert; Myertons, Hood, Kivlin, Kowert & Goetzel, P.C.

(57) ABSTRACT

System and method for generating hard and soft extruded image shadows with ray-coherent integration of extruded transparency maps. The ends of rays are positioned along a set of spokes radiating from the background point to be illuminated. In some embodiments, the weighted sum of integrals along a dense cone of rays from each point on the background is computed to determine the fraction of light obscured by the extruded artwork. The end points of the rays may be placed on lines that converge to the background point, according to some embodiments. Thus, intermediate line integrals of the alpha matte may be used to compute values for multiple rays. In other words, since the endpoints of multiple rays are placed along a single line, the results of computing the weighted sums for shorter rays may be used when calculating the sums for longer rays.

31 Claims, 9 Drawing Sheets

Project multiple rays between target pixel and light source where the endpoints of the rays align along a line in the foreground plane between the target point and the light source
800

Determine a transparency value for a first one of the rays based on transparency values for pixels along the ray
820

Determine a transparency value for a second ray based on the transparency value for the first ray.
840

FIG. 10 ized to modulate the amount of light arriving along that ray to the background point. The amount of light from each ray is weighted and added together, where the weights correspond to the angular intensity variation of the light source. The result is used to modulate the background color. Since the foreground artwork is coplanar, the ray-foreground intersection problem collapses to a single point sampling of the foreground for each ray. In other words, since the foreground artwork is flat, a complex three dimensional calculation may be avoided to determine where a particular ray intersects with the foreground artwork. The set of sample rays maps to a set of point samples. The rays may be chosen to have end-points on a regular grid in the foreground plane, which then means that the ray samples form a convolution kernel of the foreground transparency map.

SYSTEM AND METHOD FOR GENERATING IMAGE SHADOWS WITH RAY-COHERENT INTEGRATION OF EXTRUDED TRANSPARENCY MAPS

BACKGROUND

1. Field of the Invention

The present invention is directed to computer systems. More particularly, it is directed to graphical image processing.

2. Description of the Related Art

Drop shadows have become a standard visual effect in image processing applications and in real-time graphics systems. Drop shadows may be derived from original vector artwork or via convolution of an alpha mask. Drop shadows generally have the effect of visually lifting a graphic away from its background and increasing the contrast of the artwork relative to its background to enhance legibility. For these reasons, such drop shadows have become very popular.

SUMMARY

Extruded drop shadows may be generated using ray-coherent integration of extruded transparency maps, as described herein. In one embodiment, a 2D matte is used to compute the appearance of a drop shadow from an extruded shape defined by the matte. The shadow may be computed for a point light source to create sharp shadows in some embodiments. In other embodiments, the shadow may be computed for an area light source to create soft shadows.

In some embodiments, the weighted sum of integrals along a dense cone of rays from each point on the background is computed to determine the fraction of light obscured by the extruded artwork. The end points of the rays may be placed on lines that converge to the background point, according to some embodiments. Intermediate line integrals of an alpha matte may be used to compute values for multiple rays. Thus, if the endpoints of multiple rays are placed along a single line, the results of computing the weighted sums for shorter rays may be used when calculating the sums for longer rays. An alpha matte may be a set of values, generally either 0 or 1, indicating which pixels of an image (or image layer) should be transparent. In some cases, an alpha matte may be defined using grayscale values to indicate a range of transparency or opaqueness. Alpha mattes are frequently used to combine multiple images, or image layers, by allowing parts of one image to show through another. For example, one image layer may include a lattice structure. An alpha matte defining the pixels between parts of the lattice structure as transparent allows a background layer to be visible through the lattice when the two layers are combined (e.g. composited).

A traditional drop shadow may be generated by first computing an illumination value for the background. This value may be expressed in terms of the transparency map of the artwork layer shifted or translated laterally in X and Y along an offset direction. Drop shadows may be generated using certain image processing techniques. A 2-dimensional piece of artwork may have an alpha channel that is used to blend the artwork with the background. The alpha channel represents a combination of area coverage and transparency. As noted above, an alpha matte may be used to blend the foreground color (or image) with the background.

For a set of sample directions for which there is light from the light source, a ray is projected from a given background point to the plane of the foreground artwork. The transparency of the foreground artwork at the intersection point is By expressing the integral as a convolution, the ray-foreground intersection computations for each ray may be replaced by a single grid scale computation for the sample array, and fast integration techniques may be used to compute the convolution. These fast techniques include expressing the convolution as a separable filter, and using fast filters which have sub-linear cost, such as infinite impulse response filters. In image processing, such drop shadow computations are not usually expressed in terms of the corresponding area light source model, but such an analysis is useful when extending the model to extruded drop shadows for point and area light sources.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
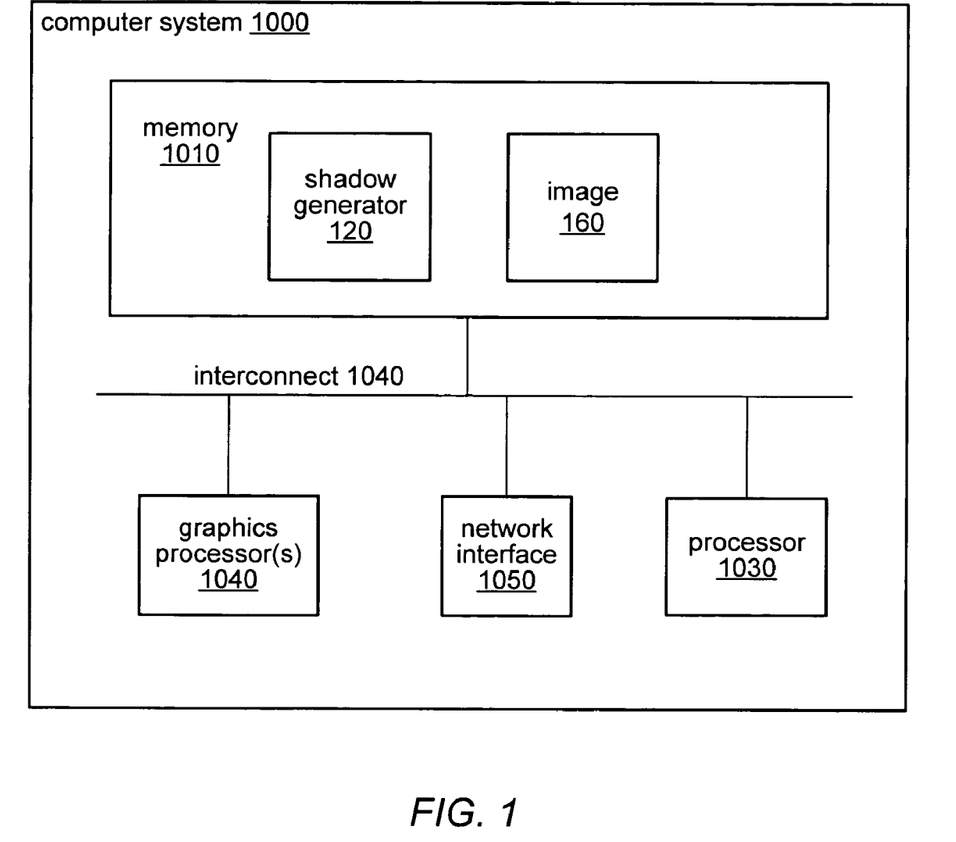
FIG. 1 is a block diagram illustrating one embodiment of a computer system capable of implement ray-coherent integration based shadow generation, as described herein.

Extruded drop shadows may be generated using ray-coherent integration of extruded transparency maps, as described herein. For example, a shadow generator may be configured to generate extruded drop shadows. FIG. 1 is a block diagram illustrating one embodiment of a computer system 1000 capable of implementing ray-coherent integration and including a shadow generator 120. Shadow generator 120 may be implemented on a user computer in any of various manners, including as a software application, a hardware graphics processing system, or a combination of hardware and software, according to various embodiments. For instance, in some embodiments, shadow generator 120 may be implemented as a software application, such as an image processing application, but in other embodiments may also be implemented as or as part of graphics processing hardware 1040, such as for a graphics accelerator card for a computer system. In yet other embodiments, shadow generator 120 may be implemented as a combination of a software application and graphics hardware.

In one embodiment, computer system 1000 may also store an image 160, such as a digital photo. In some embodiments, shadow generator 120 may be configured to provide a user interface for a user to direct the generation of shadows for image 160. Alternatively, in other embodiments, shadow generator 120 may be implemented as part of a larger graphics or media system that may provide such a user interface. The user may be able to graphically select a region of image 160 for shadow generation in some embodiments. For instance, the user may select a rectangular, or differently shaped, image region using a mouse or other input device. In other embodiments, however, shadow generator 120 may be configured to generate shadows for the entire image 160.

As illustrated in FIG. 1, a shadow generator may be configured to generate shadows using ray-coherent integration of extruded transparency maps as described herein. Drop shadows may be generated using various image processing techniques. For example, a 2-dimensional piece of artwork may have an alpha channel used to blend the artwork with the background. The alpha channel may represent a combination of area coverage and transparency. The alpha matte may be used to blend the foreground color (or image) with the background. A transparency matte may, in some embodiments, be computed by subtracting the alpha matte from 1 at each pixel. Thus, in some embodiments, an alpha matte may represent the opacity of the foreground image, while a transparency matte may represent the transparency of the foreground image. A transparency matte may determine how much of the background is visible through the foreground, and conversely, may scale the amount of light reaching the background through the foreground object when casting a shadow.

In one embodiment, shadow generator 120 may generate shadows for image 160 by first extruding the foreground artwork of the image onto an imaginary background plane a specified vertical distance below the foreground plane. Shadow generator 102 may be configured to compute the weighted sum of integrals along a dense cone of rays from each point on the background in order to determine the fraction of light obscured by the extruded artwork. For instance, shadow generator 120 may use a 2D matte of the foreground image to compute the appearance of a drop shadow from the extruded shape defined by the matte. In one embodiment shadow generator 120 may generate sharp or hard shadows using a point light source (i.e. a light source assumed to be a single point) or may generate soft shadows using an area light source.

Figure 2:
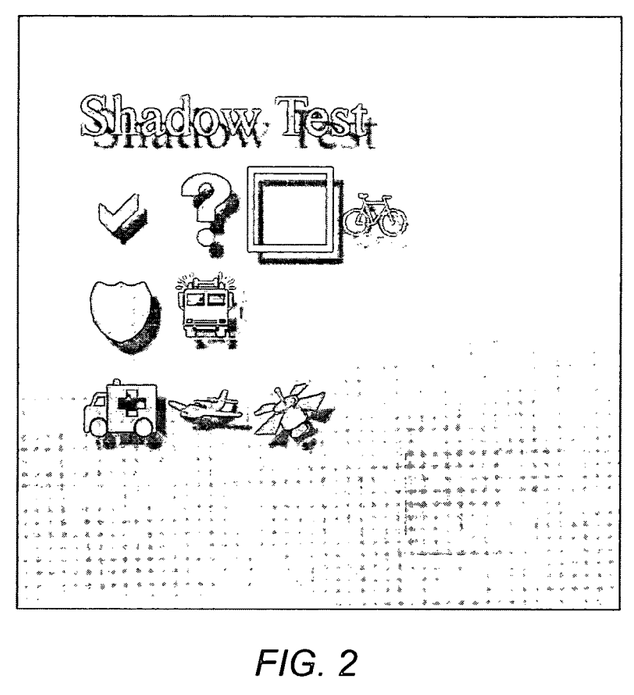
FIG. 2 illustrates an image including hard drop shadows, according to one embodiment.

A hard drop shadow may be computed by first computing an illumination value for the background. The illumination value may be expressed in terms of the transparency map of the artwork layer shifted or translated laterally in both X and Y along an offset direction. FIG. 2 illustrates such a drop shadow. As is illustrated in FIG. 2, the foreground artwork is used to generate a transparency map indicating which pixels of the background plane are obscured and therefore in shadow. Shadow generator 120 may offset or translate the transparency map laterally in the X, Y or both axes in order to generate a drop shadow. For each pixel of the background plane, the offset transparency map is used to determine whether that pixel is in shadow and how dark of a shadow. For example, while FIG. 2 illustrates foreground artwork in a single shade, some images may include foreground artwork using various shades, some of which may be considered more transparent than others. Thus, in some embodiments, the transparency map may include varying levels of transparency corresponding to the varying amount of transparency or translucency of the foreground artwork. In some embodiments, the shadows generated by a multi-level transparency map may also vary in shade or color value corresponding to the transparency and/or translucency of both the transparency map and the foreground artwork.

Figure 3:
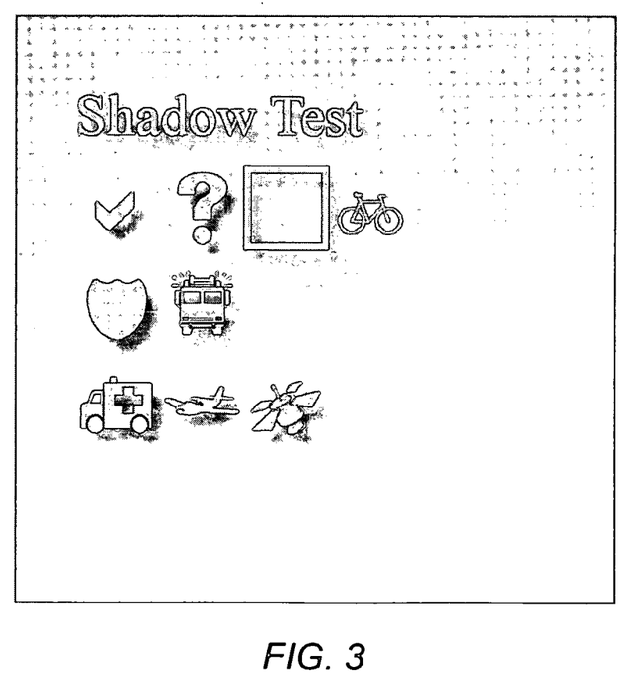
FIG. 3 illustrates an image including soft drop shadows, according to one embodiment.

A soft drop shadow may be computed using a convolution kernel. The transparency matte is blurred and used to modulate the background such as illustrated in FIG. 3. In some embodiments, shadow generator 120 may be configured to generate soft shadows, such as illustrated by FIG. 3, by generating a plurality of rays from a point on the background plane through the foreground plane and to an area light source. Since an area light source is used instead of a point light source, light from various portions of the light source pass through the foreground plane onto a single point of the background. Thus, rather than resulting in hard or sharp shadows, using an area light source may result in soft or blurry shadows, such as illustrated in FIG. 3. Shadow generator 120 may, according to one embodiment, generate soft shadows by using the weighted sum of integrals along a dense cone of rays from each point of the background to compute the fraction of light obscured by the foreground artwork.

Figure 4:
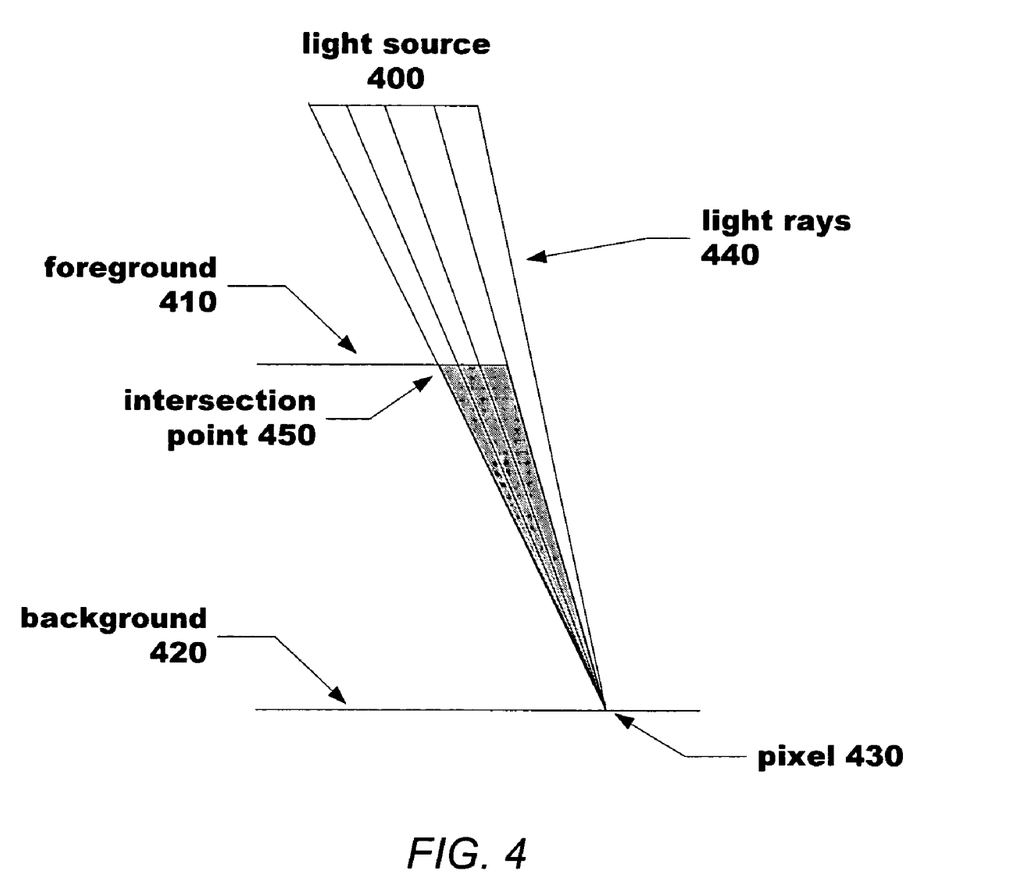
FIG. 4 is diagram illustrating the logical projection of rays from a point on the background of an image to an imaginary light source used to generate shadows, in one embodiment.

In some embodiments, computing a soft drop shadow may be considered to correspond to a real-world optical configuration in which a distant (at infinity) area light has an angular distribution that corresponds to the convolution kernel. FIG. 4 illustrates such an arrangement. In some embodiments, ray-coherent integration can be seen as an efficient implementation of an area light source computation. For a set of sample directions for which there is light from the light source, a ray is fired from a given background point to the plane of the foreground artwork. As illustrated in FIG. 4, multiple rays are projected from pixel 430 on background plane 420 through the foreground 410 to light source 400. The transparency of the foreground artwork at the intersection point 450 is used to modulate the amount of light arriving along that ray to the foreground point. The amount of light from each ray is weighted and added together, where the weights correspond to the angular intensity variation of the light source. The result is used to modulate the background color at pixel 430. Since the foreground artwork is coplanar, the ray-foreground intersection problem collapses to a single point sampling the foreground for each ray. In other words, since the foreground artwork represents a single, common plane, each ray from the light source passes through a single point on the foreground and therefore only a single point of the foreground affects the amount of light for a single ray. The set of sample rays maps to a set of point samples. The point samples may be taken from the foreground artwork, a transparency matte, or other weighted values. The rays may be chosen to have end-points on a regular grid in the foreground plane, which then means that the ray samples form a convolution kernel of the foreground transparency map.

A convolution kernel, such as at the intersection of light rays 440 and foreground plane 410, may be a matrix or set of values, such as from the foreground pixel values or a transparency map. A convolution may be considered a window or small area of an image that is scanned to determine a weighted value. For example, all the values from a particular convolution of a transparency map may be combined to determine the amount of light that hits a particular point on the background.

In some embodiments, the integrals may be expressed using a convolution. The advantage of expressing the integral as a convolution may be two-fold. The ray-foreground intersection computations for each ray are replaced by a single grid scale computation for the sample array, and fast integration techniques may be used to compute the convolution. These fast techniques include expressing the convolution as a separable filter, and using fast filters that have sub-linear cost, such as infinite impulse response filters. In image processing, drop shadow computations may not be expressed in terms of the corresponding area light source model, but such an analysis may be useful when extending the model to extruded drop shadows for point and area light sources, as will be discussed in more detail below.

Figure 5A:
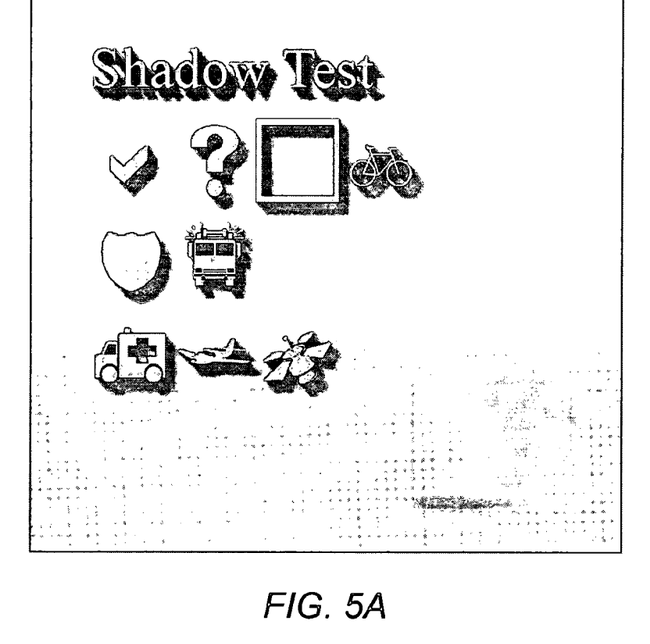
FIG. 5A illustrates an image including hard extruded drop shadows, according to one embodiment.

In some embodiments, an extension to the standard drop shadow model may be computed for sharp shadows in which the foreground object is extruded from the background to the foreground plane. The transparency for each point along a ray may modulate the amount of light passing through to the background surface. FIG. 5A illustrates an image where a hard shadow is cast from the occluding geometry (extruded foreground artwork) onto the background. By extruding the foreground artwork to the background plane (offset in the X and Y directions), light does not pass through a single foreground plane, but must pass through the extruded artwork. In some embodiments, the transparency of any particular foreground pixel is constant through the vertical extrusion. Thus, a ray of light from the light source to a particular background point does not only pass through a single point on the foreground plane and consequently the transparency map, but passes through multiple points corresponding to different points on the foreground plane.

Figure 5B:
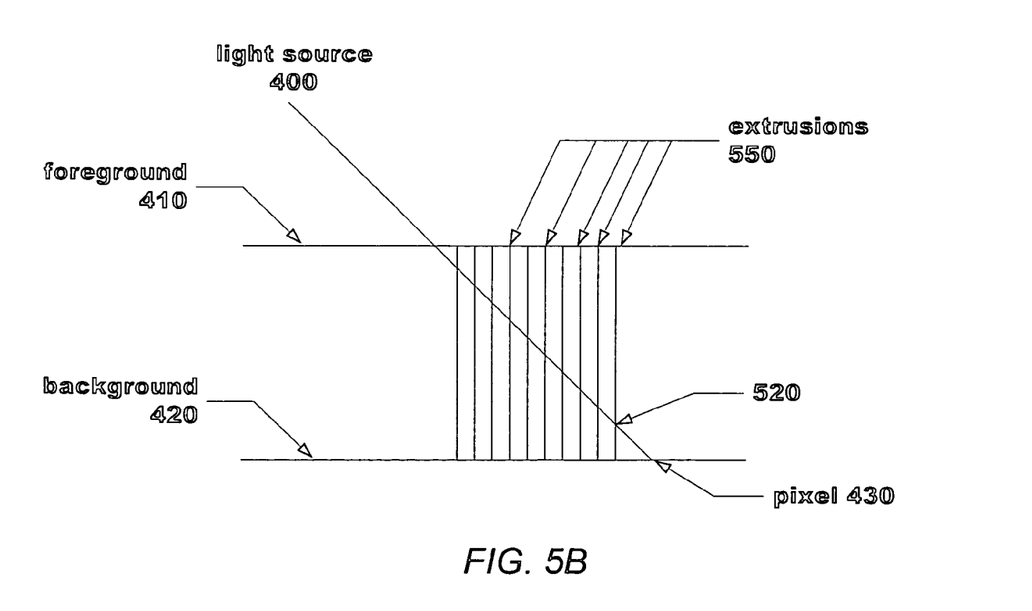
FIG. 5B is a logical diagram illustrating a ray projecting from a background point through an extrusion of the foreground toward an imaginary point light source, in one embodiment.

FIG. 5B illustrates a ray from light source 400 to background pixel 430 passing through an imaginary extrusion of the foreground artwork. Each of the vertical lines or imaginary extrusions 550 represents a single point of the foreground extruded to the background. As described above, a ray of light from light source 400 passes through multiple extrusions before reaching the background. The transparency value for each extrusion affects how much light reaches pixel 430. In some embodiments, the transparency value for each extrusion may be constant throughout the vertical extrusion. Thus a transparency value for particular extrusion may be the same whether a ray passes through the extrusion near the foreground plane or near the background plane. As will be discussed in more detail below, a constant transparency value through a vertical extrusion may allow shadow generator 120 to sample transparency values for a ray using a 2D transparency map corresponding to the transparency at the foreground plane. In other words, the transparency value for a ray through the extruded artwork may, in some embodiments, be calculated using a horizontal line through a 2D transparency map.

A given transparency map T(P) may be considered in terms of a corresponding density function f:

$$\log(T) = -f\delta t$$

Where f is the density and $\delta t$ is an incremental step length through the density field. If the original 2D transparency matte is considered to correspond to the integral normal to the background through an extrusion length E then $$\log(T) = -fE$$

This may be used to compute f at each pixel given a transparency map and the value of E, which, in some embodiments, may be constant across all pixels.

When computing shadows from extruded transparency maps, shadow generator 120 may determine the amount of light traveling along a ray from the light source to a background surface. The overall transparency of a ray (i.e. the fraction of light that passes through the density field) may be computed as an integral of the density in the following way:

$$T_{ray} = \int_0^{max} e^{-f(P+tD)} dt$$

Since shadows are generally generated corresponding to a light source not directly overhead, but instead at some X and Y offset, each ray passing through the foreground and the imaginary extrusion at an angle. For a ray being integrated through the density field at an elevation angle A to the background, then the effective length through each pixel in plane distance $\delta x$ will be as follows:

$$\log(T_A) = \frac{f \cdot \delta x}{\cos(A)} = \frac{\log(T)\delta x}{\cos(A)E}$$

$$T_A = T^\gamma$$

$$\gamma = \frac{\delta x}{\cos(A)E}$$

Note that $\gamma$ is always less than or equal to one, or the ray would travel out of the plane more than E in a single sample spacing. The value of $\gamma$ may vary from sample to sample even along the same spoke. However, for a small convolution and a large in-plane length L, then $\gamma$ will be approximately constant for all samples. $\gamma$ may be used to adjust the solidity of shadows from extruded, partially transparent, regions. In addition, for opaque artwork with anti-aliased edges, aliasing artifacts may be minimized when $\gamma$ is set to a value of one. This may have the side effect of making shadows from partially transparent areas look dense.

The appearance of hard extruded shadows, such as illustrated in FIG. 5A, may lend greater solidity to the graphic and prevent some of the visual clutter with hard drop shadows, such as those of FIG. 2 in which the shadow may diminish the legibility of the foreground artwork. To have soft extruded drop shadows the hard drop shadows might simply be blurred, but this may lead to disturbing visual cues since the blurring may not correspond to a consistent global illumination model. Instead, soft shadows may be generated according to a light source having an angular extent, such as illustrated in FIG. 6A.

Figure 6A:
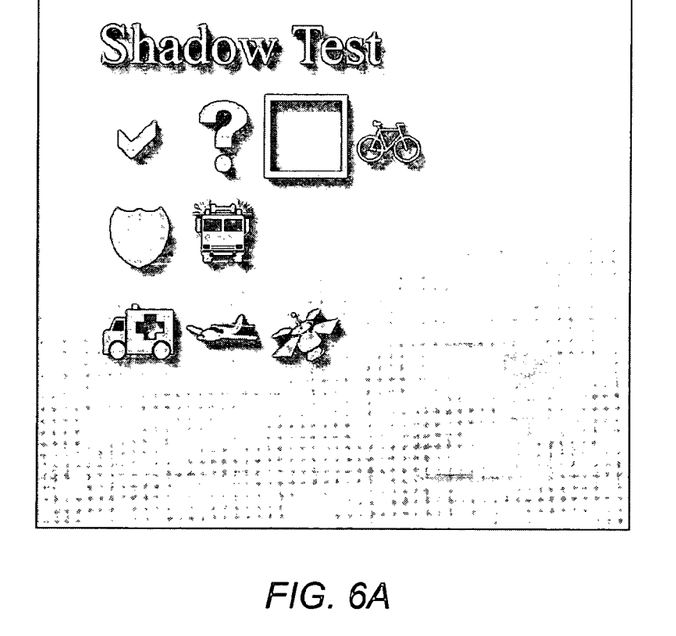
FIG. 6A illustrates, according to one embodiment, an image including soft, extruded drop shadows.

FIG. 6A illustrates extruded drop shadows case by an area light source generated using a cone integration of an alpha matte to modulate the background. As described above, when generating hard extruded drop shadows, a single ray from a point light source to a background point is used to determine how much light reaches that point on the background. When generating soft extruded shadows, such as illustrated in FIG. 6A, shadow generator 120 may combine the transparency values for multiple rays from an area light source to a single background point to determine how much light reaches background point. Thus, when generating soft extruded shadows using ray coherent integration, shadow generator 120 may be configured to determine, such as by sampling a density map or transparency map, transparency values for multiple rays projecting from a point on the background to an area light source and to combine the transparency values for the rays to determine a new color value for the background point based on the amount of light that reaches the background point.

Figure 6B:
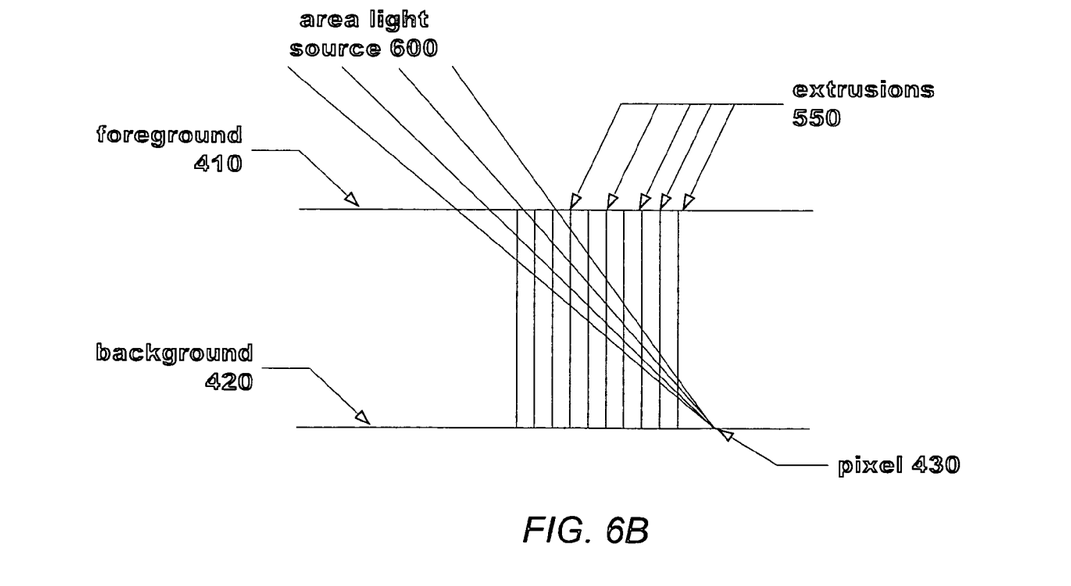
FIG. 6B is a logical diagram illustrating multiple rays projecting from a background point through an extrusion of the foreground toward an imaginary area light source, in one embodiment.

FIG. 6B illustrates multiple rays projecting from background pixel 430 through imaginary extrusions 550 to area light source 600. As described above, shadow generator 120 may be configured to generate soft extruded shadows by combining transparency values for multiple rays from an area light source to a single background pixel. As is apparent from FIG. 6B, the different rays pass through different extrusions and therefore are modulated or attenuated differently before reaching the background pixel.

Figure 7:
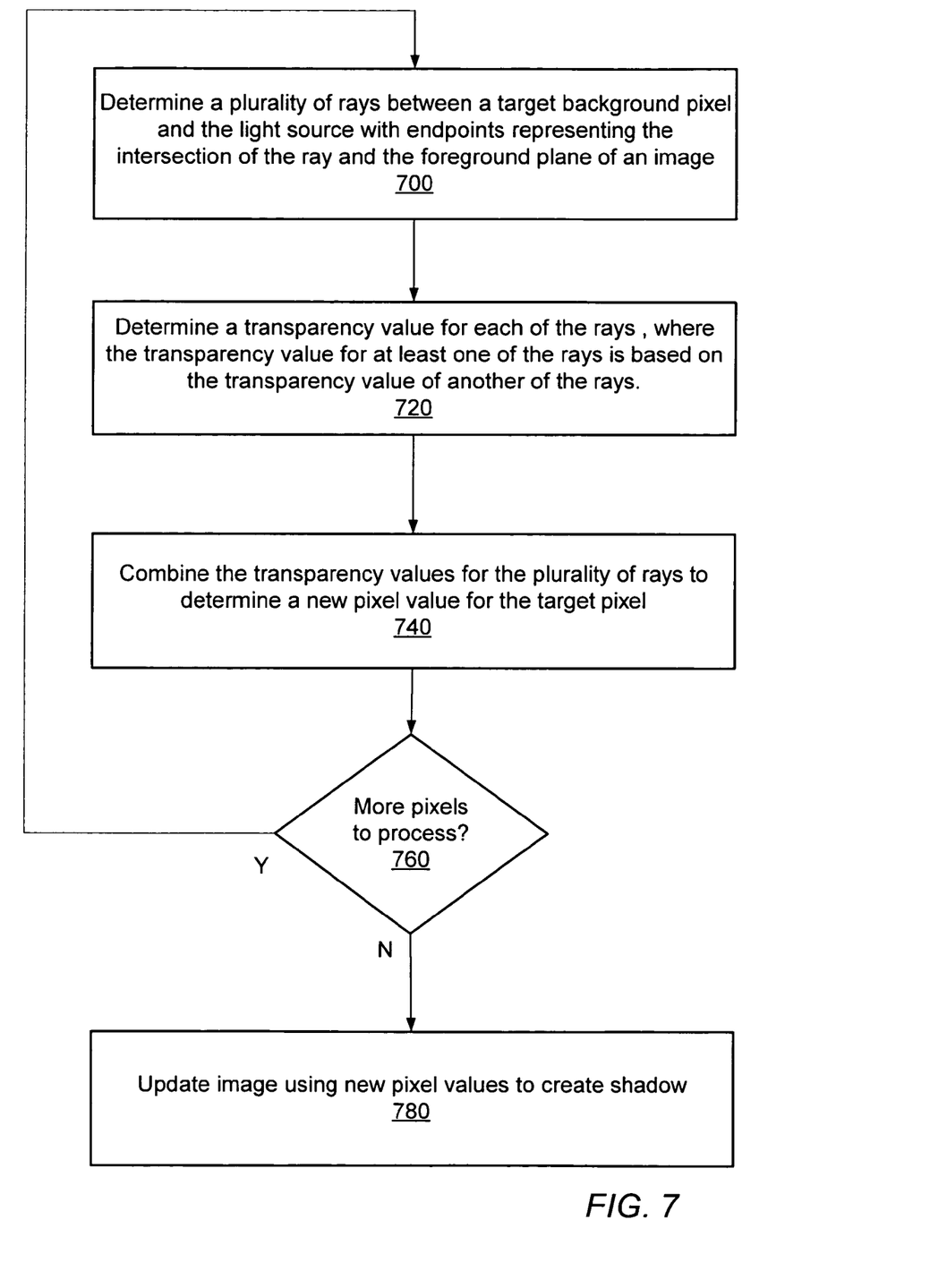
FIG. 7 is a flowchart illustrating one embodiment of a method for generating shadows according to ray-coherent integration, as described herein.

FIG. 7 is a flowchart illustrating one embodiment of a method for creating a shadow using ray-coherent integration, as described herein. As illustrated by block 700, a shadow generator, such as shadow generator 120, may be configured to determine a plurality of rays between a target background pixel, such as pixel 430, and a light source, such as light source 400, with endpoints representing the intersection of each ray and the foreground plane of an image. As described above regarding FIG. 4, a number of rays may be projected from the background, such as from pixel 430, through the foreground plane to the light source.

Additionally, a shadow generator 120 may be configured to determine a transparency value for each of the rays, where the transparency value for at least one of the rays is based on the transparency value of another of the rays, as indicated by block 720. As will be described below in more detail. The rays may be generated such that multiple rays fall along a single line and therefore the transparency value determined for a shorter ray may be used as a starting value for the transparency value for a longer ray.

As illustrated by block 740, shadow generator 120 may combine the transparency values for the plurality of rays to determine a new pixel value for the target pixel. For example, as described above, the amount of light from each ray may be weighted and added together to determine the new value for the background pixel. In one embodiment, the weights may correspond to the angular intensity variation of the light source.

If there are more pixels to process in the image, as illustrated by the positive output of decision block 760, shadow generator 120 may process additional pixels by combining transparency values for a plurality of rays determined for each additional pixel, as described above regarding blocks 700, 720 and 740. If, however, there are no additional pixels to process, as indicated by the negative output of decision block 760, shadow generator 120 may update the image using the new pixel values to create a shadow, as illustrated by block 780. In some embodiments, shadow generator 120 may be configured to update each background pixel in turn based on the combined transparency values. In other embodiments, shadow generator 120 may be configured to utilize multiple processors, such as multiple graphic processors 1040, to determine new pixel values for multiple background pixels in parallel. Since, the new pixel value for one background pixel has no effect on new pixel values for other background pixels, new values for multiple background pixels may be determined in parallel by multiple processors.

Figure 8:
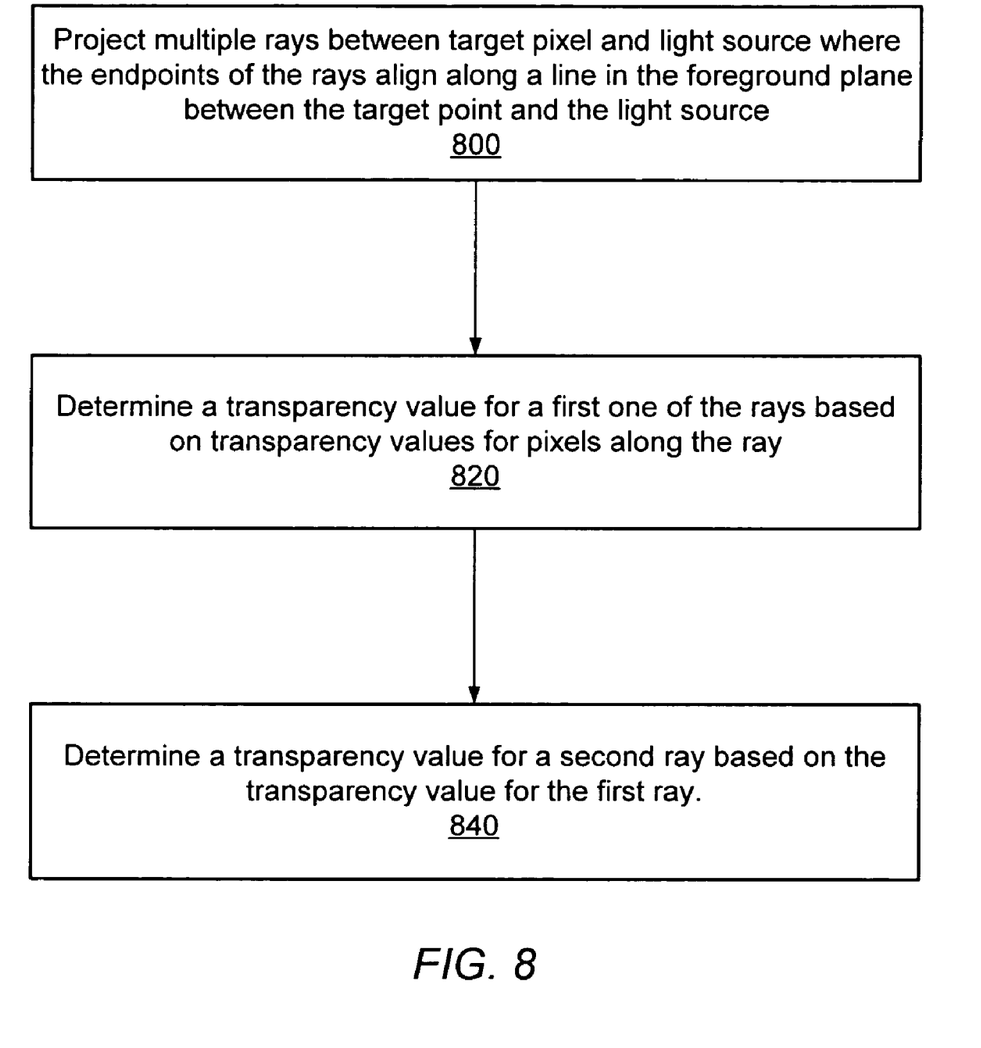
FIG. 8 is a flowchart illustrating one embodiment of a method for determining a transparency value for rays when generating shadows according to ray-coherent integration, as described herein.
Figure 9A:
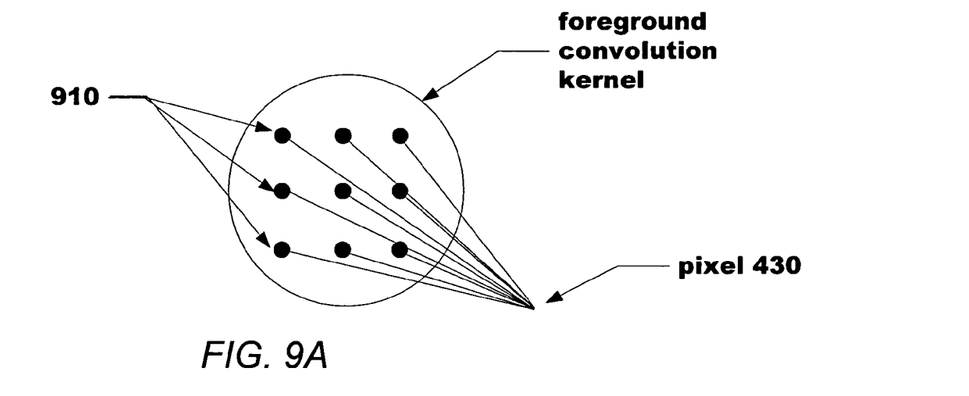
FIG. 9A is a logical diagram illustrating multiple ray endpoints arranged in an evenly spaced grid within a convolution shape, according to one embodiment.
Figure 9B:
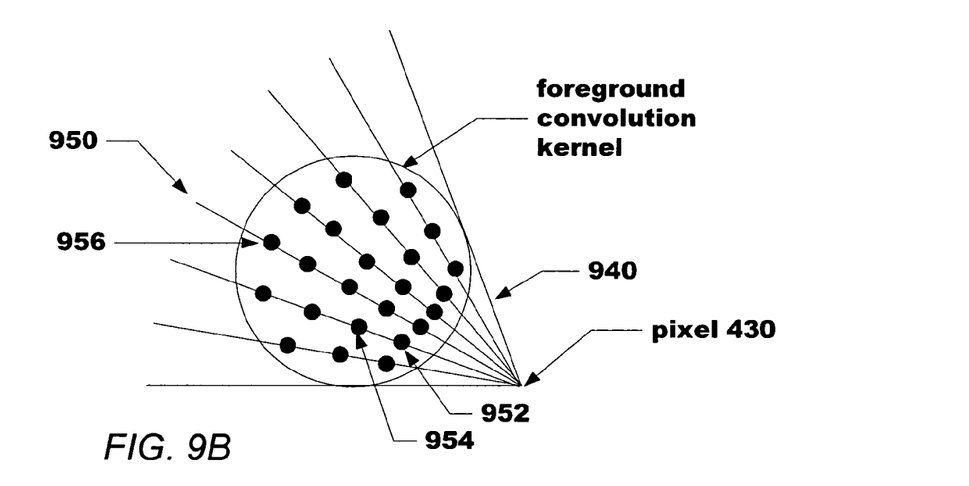
FIG. 9B is a logical diagram illustrating multiple ray endpoints arranged along evenly spaced spokes radiating from a background point, in one embodiment.

FIG. 8 is a flowchart illustrating one embodiment of a method for determining a new transparency value for one ray between a background pixel and a light source based, in part, on a transparency value for another ray between the same background pixel and the light source. As illustrated by block 800, shadow generator 120 may project multiple rays between a target background pixel and a light source where the endpoints of the rays align along a line in the foreground plane between the target point and the light source. As illustrated in FIG. 9B, discussed below, the endpoints of the rays may be determined such that the endpoints of multiple rays align along a single line in the foreground plane.

Shadow generator 820 may then determine a transparency value for a first one of the rays based on transparency values for pixels along the ray. In one embodiment, shadow generator 820 may begin by determining a transparency value for the shortest ray along the line. As described above, the transparency value may be computed as the amount of light traveling along the ray from the light source to the background surface. The overall transparency of the ray may be considered the amount of light that passes through the density field and may be computed as an integral of the density, as described above.

After determining a transparency value for the first ray, shadow generator 120 may determine a transparency value for a second ray based on the transparency value for the first ray, as illustrated by block 840. Since, as described above, the transparency does not change vertically through the foreground extrusion, and since the two rays are both on the same line through the foreground plane, overall transparency of a shorter ray along the line may be used when determining the transparency value for a longer ray along the same line.

To generate such soft shadows, it is necessary to fire a cone of rays towards the light source and to do ray-integration along each ray. Such an arrangement of rays is shown in FIG. 9A. The ends of the rays are placed on a regular grid, just as in the original soft drop shadow case. However, for each ray, the transparency is sampled densely along the ray to the ray origin. Since none of the rays of FIG. 9A have any pixel samples in common (since the rays do not align along any particular line in the foreground plan) a transparency value for each ray must be computed using individual samples. In other words, none of the samples for one ray may be used for another ray. This renders such shadow computations much more expensive than traditional drop shadows. For a given image, the cost of integration may be proportional to the number of rays and the plane-projected length of the rays. This product will scale as the cube of the linear dimension of the image, rendering it impractical for large images.

One cause of inefficiency is that each ray is generated from scratch. FIG. 9B illustrates an alternate arrangement of ray end-points so that points are placed on lines or "spokes" that radiate from the background point for which the illumination is being computed. The spokes have sample points (ray ends) spaced equally along their length. The number of samples is chosen to sample along the line with approximately uniform density. The area density of samples is then proportional to the linear distance along the spoke from the ray origin. Correct convolution must take this non-uniform sampling into account when weighting the contribution from each ray to the total illumination reaching the ray origin point.

Since multiple rays in FIG. 9B are aligned along individual lines (in the foreground plane), pixels sampled along the line 950 for endpoint 952 may also be used for endpoint 954. Thus, the transparency value for the ray ending at endpoint 952 may be used as a starting point for the transparency value for the ray ending at endpoint 954. In some embodiments, an additional weight value may be applied to the transparency value for endpoint 952 in order to account for the difference in angles between ray 952 and ray 954. In other embodiments, however, such detailed angular weighting is not necessary to the overall shadow quality and thus the transparency value for ray 952 may be used directly in the calculation of a transparency value for ray 954.

Figure 9C:
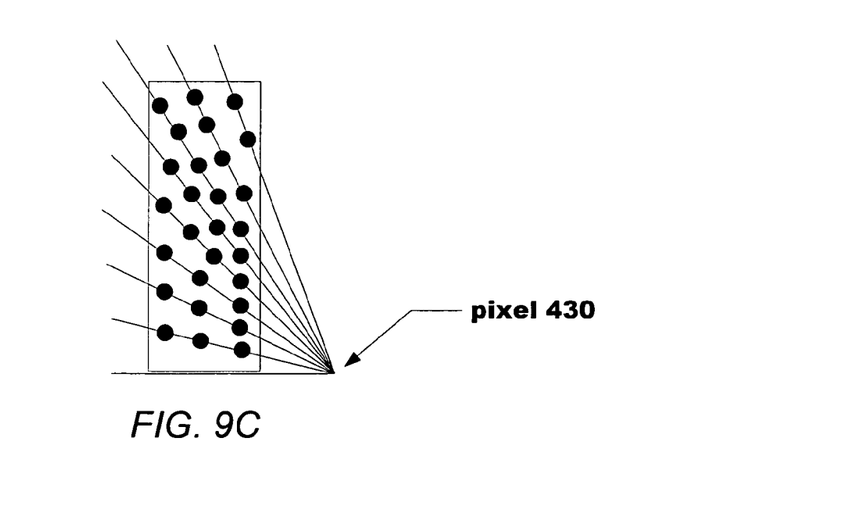
FIG. 9C is a logical diagram illustrating multiple ray endpoints arranged along even spaced spokes in a non-circular convolution shape, according to one embodiment.

Please note that while the convolution illustrated in FIGS. 9A and 9B is circular and therefore may represent a circular light source, in other embodiments, convolutions of other shapes may also be used to represent non-circular light sources. For example, a rectangular convolution might represent a rectangular light source, according to one embodiment. In general, virtually any shaped light source may be represented by differently shaped convolutions, according to various embodiments. Additionally, in some embodiments, the shape of the light source may affect the number and arrangement of rays used to determine new background values. For example, as compared to the arrangement of ray endpoints illustrated in FIG. 9B, the ray endpoints for a convolution representing a long, skinny rectangular light source may include additional spokes, but with fewer endpoints on each spoke, such as illustrated by FIG. 9C.

Figure 9D:
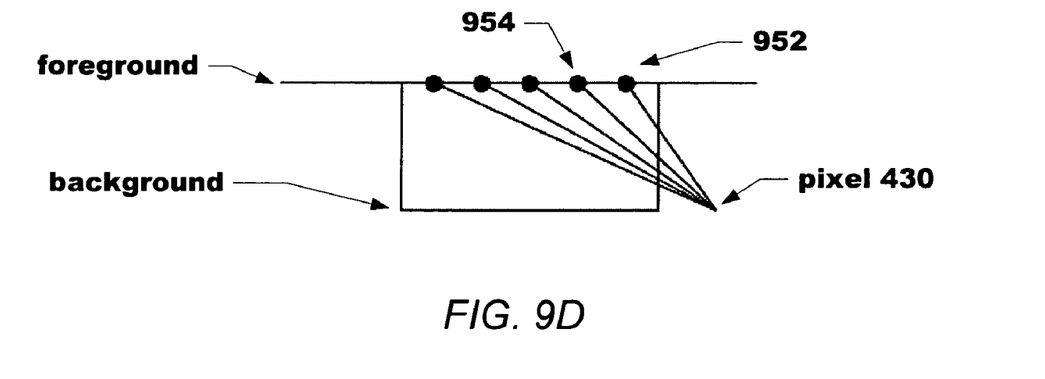
FIG. 9D is a logical diagram illustrating multiple rays aligned along a single line in the foreground plane, in one embodiment.

As described above, in some embodiments, shadow generator 120 may be configured to align multiple rays along a single line in the foreground plane. FIG. 9D illustrates the one set of rays in FIG. 9B, but as a cross section through the foreground extrusion. FIG. 9D illustrates one set of rays projected from pixel 430 to an area light source (not shown) and having endpoints, such as 952 and 954, where each ray intersects the foreground plane. For example, FIG. 9D may represent the rays along line 950 of FIG. 9B. The vertical lines in FIG. 9D may represent the vertical extension of the convolution kernel (i.e. the intersection of the light source with the foreground plane). As noted above, in some embodiments, the transparency values may be constant throughout a vertical extrusion of the foreground artwork and therefore the transparency values sampled for ray 952 may also be used for ray 954.

Figure 10:
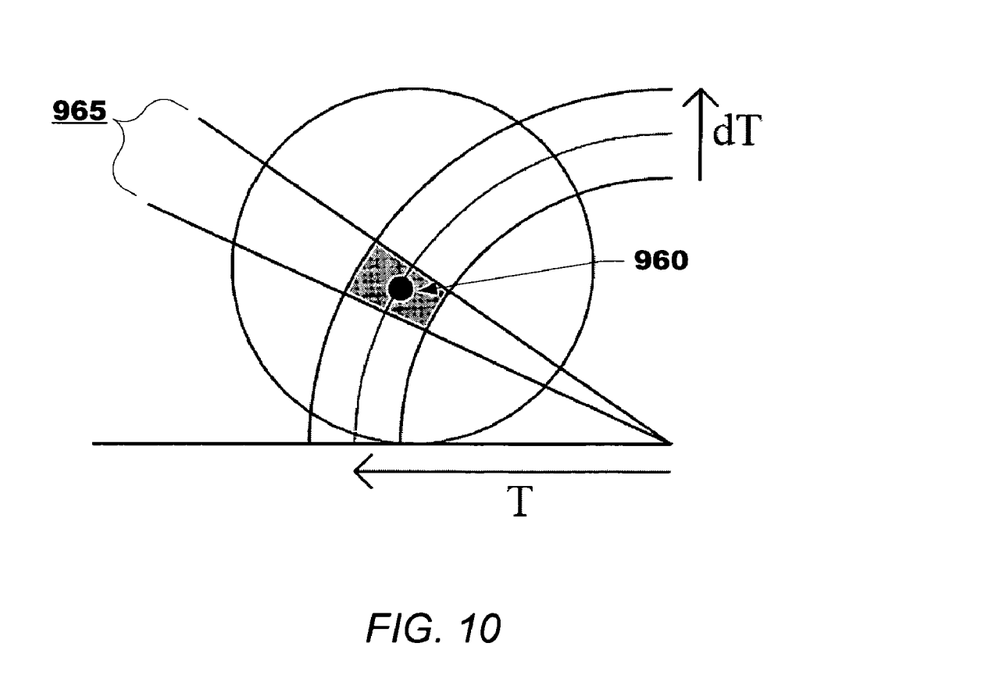
FIG. 10 is a logical diagram illustrating the relative area represented by a single ray endpoint in convolution kernel, according to one embodiment.

As noted above, when the endpoints of rays used in ray-coherent integration based shadow generation are aligned on common lines rather than spaced evenly across the convolution, the approximate area of the foreground plane that is represented by any individual ray endpoint may vary from ray endpoint to ray endpoint, according to some embodiments. For example, referring back to FIG. 9B, the area represented by ray endpoint 952 may be much smaller than the area represented by ray endpoint 956. FIG. 10 illustrates the approximate area represented by a single sample, which is proportional to T and the angle between adjacent spokes. Thus, by using area geometry the area represented by the ray endpoint may be calculated using the angle 965 between the midpoints halfway between ray 960 and its two adjacent rays (not shown) and the radius or length of the individual rays to obtain the area of the shaded section of FIG. 10. Thus, ray endpoints that are a more dense area of the convolution may each represent a smaller area than ray endpoints of less dense area of the convolution. In general, the endpoints of shorter rays may represent smaller areas than endpoints of longer rays, according to some embodiments.

According to some embodiments, of ray-coherent integration, the convolution kernel may be assumed to be zero outside of a bounding circle. Rays are intersected with the bounding circle and then the alpha map is integrated along each ray with samples that are approximately evenly spaced. As noted above, in some embodiments non-circular shaped light sources, and therefore non-circular shaped convolutions, may be used with ray-coherent integrations. For example, in one embodiment, shadow generator 120 may be configured to use elliptical or polygonal convolutions and bounding geometry. When using non-circular bounding geometry, such as resulting from a non-circular light source, the computation so ray endpoints and the sample area represented by each ray endpoint would be different than that illustrated in FIGS. 9B and 10.

For a distant (parallel) light the ray-bounding shape intersections may be identical at each pixel, whereas for a local light, where the local ray direction would change, the ray-bounding shape intersections may have to be computed freshly for each pixel.

Shadow generator 120 may be configured to calculate transparency values for individual rays and to combine the values for the rays using various methods according to different embodiments. Below one example embodiment of a method for calculating background values according to ray-coherent integration as described herein is discussed. Please note that other embodiments may perform different calculations in different manners.

In one embodiment, shadow generator 129 may start with a light direction vector expressed as an in plane normalized direction vector $\vec{D}$. The in plane 2D length from the sample point to the center of the convolution is L. The in-plane convolution kernel outer radius is R. If L is greater than R, then the starting point is outside the bounding circle of the kernel and two end-points for rays intersecting the circle are computed. Otherwise rays start at the background point and proceed to the first positive ray-bounding intersection.

For the case where the starting point is outside the bounding circle, shadow generator 120 may compute the angle $A_{center}$ from the positive x-axis to the center of the circle. Two rays tangential to the circle will deviate from $A_{center}$ by plus and minus $A_{diff}$.

Where:

$$A_{diff} = \sin^{-1}\left(\frac{R}{L}\right)$$

$$A_{min} = A_{center} - A_{diff}$$

$$A_{max} = A_{center} + A_{diff}$$

In some embodiments, shadow generator 120 may divide the space from $A_{min}$ to $A_{max}$ into N equal intervals. In one embodiment, the maximum spatial distance between spokes may be no more than $S_{max}$, which may be the required maximum sample size. Therefore, in some embodiment, the number of spokes may be computed using:

$$N = \frac{A_{diff}(A+L)}{S_{max}}$$

Typically, $S_{max}$ will be approximately the same size as the pixel spacing.

Shadow generator 120 may also generate a set of equally spaced rays or spokes, such as by using the formula:

for each I from 0 to N-1:

$$A_i = \frac{A_{min} + (A_{max} - A_{min})\left(i + \frac{1}{2}\right)}{2N}$$

By offsetting the angles by half of a spoke's spacing, computing rays that are tangential to the circle may be avoided, according to some embodiments. Shadow generator 120 may compute a ray direction $\vec{D}_i$:

$$\vec{D}_i = (\sin(A_i), \cos(A_i))$$

In one embodiment, shadow generator 120 may compute the intersections between rays with direction $\vec{D}_i$ and the kernel bounding circle. Two scalar values C and B may be computed:

$$C = L^2 + R^2$$

$$B = 2L\vec{D}_i \cdot \vec{D}$$

$$S^2 = B^2 - 4C$$

The ray parameters for the intersection points may be:

$$t_1 = \frac{B-S}{2}$$

-continued $$t_2 = \frac{B+S}{2}$$

Where the position of a point along the ray may be given by:

$$\vec{P} = \vec{P}_s + t\vec{D}_i$$

Shadow generator 120 may compute samples equally spaced along each spoke between t=0 and t=$t_1$ to compute the line integral of the product of transparencies along the ray, according to one embodiment. Shadow generator 120 may sample the rays with a number of samples M such that the maximum in-plane distance between the samples is $S_{max}$. For convenience, the coordinates may be scaled such that $S_{max}$ is a single pixel spacing, and so has a value of one.

$$M = \frac{t_1}{S_{max}}$$

For each ray shadow generator 120 may first compute the line integral to the first intersection with the bounding circle. This may be achieved by samples at $\vec{P}_n$.

$$\vec{P}_n = \vec{P}_s + \left(n + \frac{1}{2}\right)\frac{t_1}{M}\vec{D}_i$$

The cumulative transparency to the first intersection point is computed using:

$$T1 = \prod_{i=0}^{i=M-1} e^{-f(\vec{P}_i)\frac{t_1}{M}} \approx \prod_{i=0}^{i=M-1} T(\vec{P}_i)$$

Shadow generator 120 may also compute M', the number of samples to take along the ray within the bounding circle:

$$M' = \frac{t_2 - t_1}{S_{max}}$$

The computation of samples along the ray is done at locations given by:

$$\vec{P}_n = \vec{P}_s + \left(t_1 + \left(n + \frac{1}{2}\right)\frac{t_2 - t_1}{M'}\right)$$

$$T_j = T_1 \prod_{i=0}^{i=j} E^{-f(\vec{P}'_i)\frac{t_2-t_1}{M1}}$$

This naturally leads to the relationship:

$$T_j = T_{j-1} e^{-f\left(P_i'\right)\frac{t_2-t_1}{M'}} \approx T_{j-1} T\left(P_j'\right)$$

The area weighting of a sample within the circle is approximated by $$A_j = \left(t_1 + \left(j + \frac{1}{2}\right)\frac{t_2-t_1}{M'}\right)\frac{t_2-t_1}{M1}$$

The contribution to the illumination of the ray origin point is a product of the cumulative transparency for the ray multiplied by the area term for the sample and the position dependent kernel function for the light-source distribution. (A constant kernel would emulate the appearance of a circular light source.)

$$I = \sum_{i=0}^{i=M'-1} T_j^y A_j K\left(P_0 + \left(t_1 + (0.5+i)\frac{t_2-t_1}{M'}\right)D_i\right)$$

The total weighting value is given by $$W = \sum_{i=0}^{i=M'-1} A_j$$

The final intensity reaching the background $I_b$ is given by $$I_b = \frac{I}{W}$$

Please note that the discussion above represents one possible manner of computing the amount of light reaching the background of an image according to one example embodiment. Other embodiments may utilize different formulae or calculations.

The following pseudo code represents one embodiment of generating extruded soft drop shadows, as may be implemented by shadow generator 120. In reference to the following pseudo-code, dir is an in-plane unit vector that points towards the light source in-plane projected position. Distance controls the 2-dimensional length of the shadow. Extrude is a flag indicating whether extrusion is used and radios is a float that determines the amount of blur of the shadow, assumed to be greater than zero. SpokeAngularDensity represents a function that improves the visual accuracy of the result. A value between 0.4 and 1.0 may be visually acceptable, according to some embodiments.

In one embodiment, shadow generator 120 may compute the shadow map value for a given pixel for a surface casting a shadow with alpha map sourceTexture, according to the following pseudo-code. V may represent a pair of coordinates (of type float2) that store the output pixel location and the result may be stored as a floating-point value in a float called destinationValue, according to one embodiment. For simplicity, this example assumes that illumination is uniform with the circle of integration for the projected light source.

```
float maxDistance = radius + distance;
    // The distance to the furthest portion of the convolution region
float lighting = 0.0;
    // The amount of light that gets through to the surface
float weight = 0.0;
float radiusSquared = radius * radius;
float2 circleCenter = dir * distance;
float circleCenterSquared = distance * distance;
// Frame the circle with tangential rays
float C = circleCenterSquared - radiusSquared;
float angleMin = 0.0;
float angleMax = 2.0 * pi;
float angleCenter = 2.0 * pi * Direction;
if (distance > radius)
{
    float deltaAngle = asin (radius / distance);
    angleMin = angleCenter - deltaAngle;
    angleMax = angleCenter + deltaAngle;
}
int numSpokes = int(spokeAngularDensity * (angleMax - angleMin) *
    maxDistance) + 1;
for (int spoke = 0; spoke < numSpokes; spoke++)
{
    // Compute the spoke direction evenly spaced around the circle
    float angle = angleMin + (angleMax - angleMin) * (float (spoke)
        + 0.5) / float(numSpokes);
    float2 spokeDirection = float2(-sin(angle), cos(angle));
    // Compute whether the spoke intersects the circle
    float directionDotCenter = dot(spokeDirection, circleCenter);
    // if there is a valid intersection between the ray and the
        circle
    if (directionDotCenter * directionDotCenter > C)
    {
        // Compute the near and far intersection point
        float B = -2.0 * directionDotCenter;
        float diff = sqrt(B * B - 4.0 * C);
        float t1 = (-B - diff) * 0.5;
        float t2 = (-B + diff) * 0.5;
        t1 = (t1 > 0.0)? t1 : 0.0;
        float transparency = 1.0;
        // First compute the cumulative transparency between t =
            0.0 and t1
        if (t1 > 0.0 && extrude)
        {
            int numSamples = int(1.4 * t1);
            float deltaT = t1 / float(numSamples);
            float t = 0.5 * deltaT;
            for( int sample = 0; sample < numSamples; sample++)
            {
                float2 samplePosition = v + t * spokeDirection;
                transparency *= (1.0 -
                    sampleTextureUsingBilinearInterpolation(
                    sourceTexture, samplePosition) .b);
                t += deltaT;
            }
        }
        int numSamples2 = int(1.4 * (t2 - t1)) + 1;
        float deltaT = (t2 - t1) / float(numSamples2);
        float t = t1 + 0.5 * deltaT;
            if (Extrude)
            {
            for( int sample2 = 0; sample2 < numSamples2; sample2++)
            {
                float2 samplePosition = v + t * spokeDirection;
                transparency *= (1.0 -
                    sampleTextureUsingBilinearInterpolation (sourceT
                    exture, samplePosition) .b);
                float area = t * deltaT;
                lighting += transparency * area;
                weight += area;
                t += deltaT;
            }
            }
            else
            {
            for( int sample2 = 0; sample2 < numSamples2; sample2++)
            {
```

-continued

```
        float2 samplePosition = v + t * spokeDirection;
        transparency = (1.0 −
            sampleTextureUsingBilinearInterpolation (sourceT
            exture, samplePosition) .b);
        float area = t * deltaT;
        lighting += transparency * area;
        weight += area;
        t += deltaT;
      }
    }
  }
}
destinationValue = lighting / weight;
```

Ray-coherent integration of extruded transparency maps, as described herein may be implemented on various types of computer systems. Referring again to FIG. 1, computer system 1000 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, or in general any type of computing device.

The shadow generator 120 described herein may be provided as a computer program product, or software, that may include a computer-readable storage medium having stored thereon instructions, which may be used to program a computer system (or other electronic devices) to implement a shadow generator as described herein. A computer-readable storage medium includes any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, or other types of signals or mediums.).

A computer system 1000 may include a processor unit 1030 (possibly including multiple processors, a single threaded processor, a multi-threaded processor, a multi-core processor, or other type of processor). The computer system 1000 may also include one or more system memories 1010 (e.g., one or more of cache, SRAM DRAM, RDRAM, EDO RAM, DDR RAM, SDRAM, Rambus RAM, EEPROM, or other memory type), an interconnect 1040 (e.g., a system bus, LDT, PCI, ISA, or other bus type), and a network interface 1050 (e.g., an ATM interface, an Ethernet interface, a Frame Relay interface, or other interface). The memory medium 1010 may include other types of memory as well, or combinations thereof. Embodiments of the shadow generator described herein may include fewer or additional components not illustrated in FIG. 1 (e.g., video cards, audio cards, storage devices, additional network interfaces, peripheral devices, or other components). The processor unit 1030, the network interface 1050, and the system memory 1010 may be coupled to the interconnect 1040. It should also be noted that one or more components of system 1000 might be located remotely and accessed via a network. One or more of the system memories 1010 may embody a shadow generator 120.

Network interface 1040 may be configured to enable computer system 1000 to communicate with other computers, systems or machines, such as across network 100, described above. Network 100 may enable data communication between computer system 1000 and among other entities illustrates in FIGS. 1A and 1B, described above. Network interface 1040 may use standard communications technologies and/or protocols. Network 100 may include, and network interface 1040 may utilize, links using technologies such as Ethernet, 802.11, integrated services digital network (ISDN), digital subscriber line (DSL), and asynchronous transfer mode (ATM) as well as other communications technologies. Similarly, the networking protocols used on network 100 may include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP), among other network protocols. The data exchanged over network 100 by network interface 1040 may be represented using technologies, languages, and/or formats, such as the hypertext markup language (HTML), the extensible markup language (XML), and the simple object access protocol (SOAP) among other data representation technologies. Additionally, all or some of the links or data may be encrypted using any suitable encryption technologies, such as the secure sockets layer (SSL), Secure HTTP and/or virtual private networks (VPNs), the international data encryption standard (DES or IDEA), triple DES, Blowfish, RC2, RC4, RC5, RC6, as well as other data encryption standards and protocols. In other embodiments, custom and/or dedicated data communications, representation, and encryption technologies and/or protocols may be used instead of, or in addition to, the particular ones described above.

In some embodiments, memory 1010 may include program instructions configured to implement a shadow generator 120, as described herein. Shadow generator 120 may be implemented in any of various programming languages or methods. For example, in one embodiment, shadow generator 120 may be JAVA based, while in another embodiments, it may be implemented using the C or C++ programming languages.

While the shadow generator has been described with reference to various embodiments, it will be understood that these embodiments are illustrative and that the scope of the document-based data collection system is not limited to them. Many variations, modifications, additions, and improvements are possible. More generally, the present shadow generator is described in the context of particular embodiments. For example, the blocks and logic units identified in the description are for ease of understanding and not meant to limit the shadow generator to any particular embodiment. Functionality may be separated or combined in blocks differently in various realizations or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

Although the embodiments above have been described in detail, numerous variations and modifications will become apparent once the above disclosure is fully appreciated. It is intended that the following claims be interpreted to embrace all such variations and modifications.

What is claimed is:

1. A system, comprising:
one or more processors;
memory coupled to the one or more processors, wherein the memory is configured to store program instructions executable by the one or more processors to:
determine a transparency value for each of a plurality of rays between a target pixel of an image and a light source for calculating shadow values cast from a foreground plane of the image to an imaginary background plane extended a specified vertical distance below the foreground plane;
wherein each of the plurality of rays comprises an endpoint at an intersection of that ray and the foreground plane, wherein the endpoints of two or more of the rays align in the foreground plane along a line between the target pixel and the light source, and wherein the transparency value for at least one of the two or more rays is based on the transparency value of another of the two or more rays; and
determine, based on the transparency values for the plurality of rays, a new pixel value for the target pixel.

2. The system as recited in claim 1, wherein the program instructions are further executable to update the image using the new pixel value to create an extruded drop shadow effect in the image.

3. The system as recited in claim 1, wherein the transparency value for each ray is based on one or more pixel values.

4. The system as recited in claim 1, wherein the program instructions are further executable to determine the plurality of rays between the target pixel and the light source, wherein the endpoint of each ray falls within a convolution kernel shape representing the intersection of the light source and the foreground plane.

5. The system as recited in claim 1, wherein the endpoints for the plurality of rays each is positioned along one of a plurality of lines in the foreground plane between the target pixel and the light source.

6. The system as recited in claim 1, wherein to determine a transparency value for each of a plurality of rays the program instructions are further executable to combine transparency values for one or more pixel values along a line in the foreground plane between the target pixel and the ray's endpoint.

7. The system as recited in claim 1, wherein the program instructions are further executable to determine a convolution kernel shape representing an intersection of the light source and the foreground plane.

8. The system as recited in claim 7, wherein the program instructions are further executable to weight the transparency value of each ray based on a relative density of ray endpoints within the convolution kernel shape.

9. The system as recited in claim 1, wherein an angle between any two adjacent ones of the plurality of rays is substantially equal to an angle between any other two adjacent ones of the plurality of rays.

10. The system as recited in claim 1, wherein the program instructions are further executable to weight the transparency value of each ray based on an angle of the ray with the background plane.

11. The system as recited in claim 1, wherein to determine the transparency value for each of the plurality of rays, the program instructions are further executable to determine one or more transparency samples along each ray, wherein the transparency samples are computed based on pixel values of the foreground plane corresponding to equally spaced positions along the line in the foreground plane.

12. A method, comprising:
performing by one or more processors:
determining a transparency value for each of a plurality of rays between a target pixel of an image and a light source for calculating shadow values cast from a foreground plane of the image to an imaginary background plane extended a specified vertical distance below the foreground plane;
wherein each of the plurality of rays comprises an endpoint at an intersection of the ray and the foreground plane, wherein the endpoints of two or more of the rays align in the foreground plane along a line between the target pixel and the light source, and wherein the transparency value for at least one of the two or more rays is based on the transparency value of another of the two or more rays; and
determining, based on the transparency values for the plurality of rays, a new pixel value for the target pixel.

13. The method as recited in claim 12, wherein the transparency value for each ray is based on one or more pixel values.

14. The method as recited in claim 12, further comprising determining the plurality of rays between the target pixel and the light source, wherein the endpoint of each ray falls within a convolution kernel shape representing the intersection of the light source and the foreground plane.

15. The method as recited in claim 12, wherein the endpoints for the plurality of rays each is positioned along one of a plurality of lines in the foreground plane between the target pixel and the light source.

16. The method as recited in claim 12, wherein said determining a transparency value for each of a plurality of rays comprises combining transparency values for one or more pixel values along a line in the foreground plane between the target pixel and the ray's endpoint.

17. The method as recited in claim 12, further comprising determining a convolution kernel shape representing an intersection of the light source and the foreground plane.

18. The method as recited in claim 17, further comprising weighting the transparency value of each ray based on the relative density of ray endpoints within the convolution kernel shape.

19. The method as recited in claim 12, wherein an angle between any two adjacent ones of the plurality of rays is substantially equal to an angle between any other two adjacent ones of the plurality of rays.

20. The method as recited in claim 12, further comprising weighting the transparency value of each ray based on an angle between the ray and the background plane.

21. The method as recited in claim 12, wherein said determining the transparency value for each of the plurality of rays comprises determining one or more transparency samples along each ray, wherein the transparency samples are computed based on pixel values of the foreground plane corresponding to equally spaced positions along the line in the foreground plane.

22. A computer-readable storage medium storing program instructions that when executed by a computer system implement:
determining a transparency value for each of a plurality of rays between a target pixel of an image and a light source for calculating shadow values cast from a foreground plane of the image to an imaginary background plane extended a specified vertical distance below the foreground plane;

wherein each of the plurality of rays comprises an endpoint at an intersection of the ray and the foreground plane; wherein the endpoints of two or more of the rays align in the foreground plane along a line between the target pixel and the light source, and wherein the transparency value for at least one of the two or more rays is based on the transparency value of another of the two or more rays; and determining, based on the transparency values for the plurality of rays, a new pixel value for the target pixel.

23. The medium as recited in claim 22, wherein the transparency value for each ray is based on one or more pixel values.

24. The medium as recited in claim 22, wherein the program instructions when executed by the computer system further implement determining the plurality of rays between the target pixel and the light source, wherein the endpoint of each ray falls within a convolution kernel shape representing the intersection of the light source and the foreground plane.

25. The medium as recited in claim 22, wherein the endpoints for the plurality of rays each is positioned along one of a plurality of lines in the foreground plane between the target pixel and the light source.

26. The medium as recited in claim 22, wherein said determining a transparency value for each of a plurality of rays comprises combining transparency values for one or more pixel values along a line in the foreground plane between the target pixel and the ray's endpoint.

27. The medium as recited in claim 22, wherein the program instructions when executed by the computer system further implement determining a convolution kernel shape representing an intersection of the light source and the foreground plane.

28. The medium as recited in claim 27, wherein the program instructions when executed by the computer system further implement weighting the transparency value of each ray based on the relative density of ray endpoints within the convolution kernel shape.

29. The medium as recited in claim 22, wherein an angle between any two adjacent ones of the plurality of rays is substantially equal to an angle between any other two adjacent ones of the plurality of rays.

30. The medium as recited in claim 22, wherein the program instructions when executed by the computer system further implement weighting the transparency value of each ray based on an angle between the ray and the background plane.

31. The medium as recited in claim 22, wherein said determining the transparency value for each of the plurality of rays comprises determining one or more transparency samples along each ray, wherein the transparency samples are computed based on pixel values of the foreground plane corresponding to equally spaced positions along the line in the foreground plane.

* * * * *